US012771493B2

(12) United States Patent
Manolakos et al.

(10) Patent No.: US 12,771,493 B2
(45) Date of Patent: Oct. 20, 2026

(54) UU-RTT OR SL-RTT MEASUREMENT AND REPORTING OPTIMIZATION

(71) Applicant: QUALCOMM Incorporated, San Diego, CA (US)

(72) Inventors: Alexandros Manolakos, Athens (GR); Mukesh Kumar, Hyderabad (IN); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 18/692,316

(22) PCT Filed: Oct. 3, 2022

(86) PCT No.: PCT/US2022/045566
§ 371 (c)(1),
(2) Date: Mar. 14, 2024

(87) PCT Pub. No.: WO2023/091244
PCT Pub. Date: May 25, 2023

(65) Prior Publication Data

US 2024/0430046 A1 Dec. 26, 2024

(30) Foreign Application Priority Data

Nov. 18, 2021 (GR) .............................. 20210100808

(51) Int. Cl.
*H04L 5/00* (2006.01)
*H04W 24/10* (2009.01)
*H04W 72/0446* (2023.01)

(52) U.S. Cl.
CPC ........... *H04L 5/0005* (2013.01); *H04W 24/10* (2013.01); *H04W 72/0446* (2013.01)

(58) Field of Classification Search
CPC .. H04L 5/0005; H04W 24/10; H04W 72/0446
See application file for complete search history.

(56) References Cited

U.S. PATENT DOCUMENTS

2021/0037532 A1 2/2021 Nam et al.
2024/0235898 A1* 7/2024 Enescu ............... H04L 25/0254
(Continued)

OTHER PUBLICATIONS

Huawei, et al., "Discussion on Remaining Issues for UE Rx-Tx Time Difference Measurement Requirements", 3GPP TSG-RAN WG4 Meeting #98-bis-e, R4-2107001, 3rd Generation Partnership Project, Mobile Competence Centre, 650, Route Des Lucioles, F-06921 Sophia-Antipolis Cedex, France , vol. RAN WG4, No. Electronic Meeting, Apr. 12, 2021-Apr. 20, 2021, Apr. 2, 2021, 5 Pages, XP052177363, Chapter 2—Discussion.
(Continued)

*Primary Examiner* — Chandrahas B Patel
(74) *Attorney, Agent, or Firm* — Procopio, Cory, Hargreaves & Savitch LLP

(57) ABSTRACT

Method and apparatus for optimizing the reporting of Uu-RTT or SL-RTT measurements. The apparatus determines a RX-RS-TX-RS proximity parameter defining a proximity window around the RX-RS resource for receiving the RX-RS. The apparatus identifies a TX-RS resource of at least one TX-RS resource for transmitting TX-RS within a proximity window around a RX-RS resource for receiving RX-RS. An identified TX-RS resource being used by the UE for determining a UE RX-TX time difference associated with a time difference between reception of the RX-RS and transmission of the TX-RS. The apparatus measures the UE RX-TX time difference based on received RX-RS in the RX-RS resource and transmitted TX-RS in the identified TX-RS resource when TX-RS is transmitted in the identified TX-RS resource.

28 Claims, 13 Drawing Sheets

(56) References Cited

U.S. PATENT DOCUMENTS

| | | | | |
|---|---|---|---|---|
| 2024/0406931 | A1* | 12/2024 | Sahin | H04W 64/00 |
| 2025/0125858 | A1* | 4/2025 | Svendsen | H04B 7/063 |

OTHER PUBLICATIONS

Intel Corporation: "Discussion on UE RX-TX Time Difference Measurement Requirements for NR Pos", 3GPP TSG-RAN WG4 Meeting# 98-bis-e, R4-2106453, 3rd Generation Partnership Project, Mobile Competence Centre, 650, Route Des Lucioles, F-06921 Sophia-Antipolis Cedex, France, vol. RAN WG4, No. E-Meeting, Apr. 12, 2021-Apr. 20, 2021, Apr. 2, 2021, 8 Pages, XP051992490, Chapter 2.1—SRS Periodicity Impacts on UE RX-TX Time Difference Measurement Period.

International Search Report and Written Opinion—PCT/US2022/045566—ISA/EPO—Jan. 24, 2023.

* cited by examiner

UU-RTT OR SL-RTT MEASUREMENT AND REPORTING OPTIMIZATION

CROSS-REFERENCE TO RELATED APPLICATION

This application claims the benefit of Greek patent application Ser. No. 20210100808, entitled "UU-RTT OR SL-RTT MEASUREMENT AND REPORTING OPTIMIZATION" and filed on Nov. 18, 2021, which is expressly incorporated by reference herein in its entirety.

TECHNICAL FIELD

The present disclosure relates generally to communication systems, and more particularly, to a configuration for optimizing the reporting of Uu-round trip time (RTT) or sidelink (SL)-RTT measurements.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus determines a reception (RX) reference signals (RS) (RX-RS)-transmission (TX) reference signals (RS) (TX-RS) proximity parameter defining a proximity window around the RX-RS resource for receiving the RX-RS. The apparatus identifies a TX-RS resource of at least one TX-RS resource for transmitting TX-RS within the proximity window around a RX-RS resource for receiving RX-RS. An identified TX-RS resource being used by the UE for determining a UE RX-TX time difference associated with a time difference between reception of the RX-RS and transmission of the TX-RS. The apparatus measures the UE RX-TX time difference based on received RX-RS in the RX-RS resource and transmitted TX-RS in the identified TX-RS resource when TX-RS is transmitted in the identified TX-RS resource.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
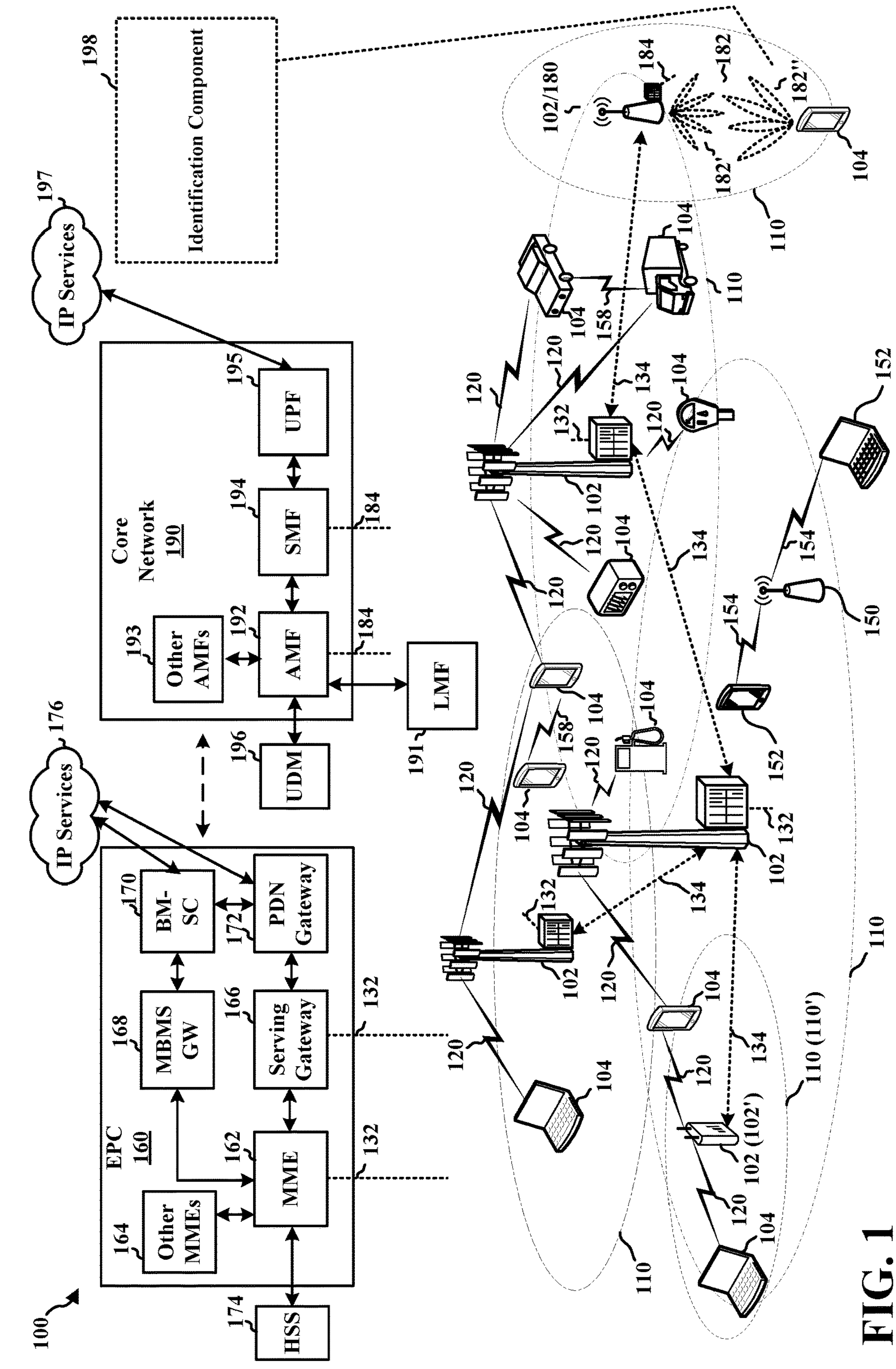
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHZ). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services. In some instances, the core network 190 may communicate with a location management function (LMF) 191. The LMF may be utilized in positioning architecture. The LMF may receive measurements and assistance information from the NG-RAN and the UE 104 via the AMF 192. The LMF may utilize the measurements and assistance information to compute the position of the UE 104. The LMF may provide a positioning configuration to the UE via the AMF. In such instances, the NG-RAN (e.g., base station 102/180) receives the positioning configuration from the AMF and may then provide the positioning configuration to the UE. In some instances, the NG-RAN (e.g., base station 102/180) may configure the UE with the positioning configuration.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to identify at least one uplink resource within a proximity window to calculate a reception-transmission time difference. For example, the UE 104 may comprise an identification component 198 configured to identify at least one uplink resource within a proximity window to calculate a reception-transmission time difference. The UE 104 may determine a RX-RS-TX-RS proximity parameter defining a proximity window around the RX-RS resource for receiving the RX-RS. The UE 104 may identify a TX-RS resource of at least one TX-RS resource for transmitting TX-RS within a proximity window around a RX-RS resource for receiving RX-RS. An identified TX-RS resource being used by the UE for determining a UE RX-TX time difference associated with a time difference between reception of the RX-RS and transmission of the TX-RS. The UE 104 may measure the UE RX-TX time difference based on received RX-RS in the RX-RS resource and transmitted TX-RS in the identified TX-RS resource when TX-RS is transmitted in the identified TX-RS resource.

Although the following description may be focused on 5G NR, the concepts described herein may be applicable to other similar areas, such as LTE, LTE-A, CDMA, GSM, and other wireless technologies.

Figures 2A, 2B, 2C, 2D:
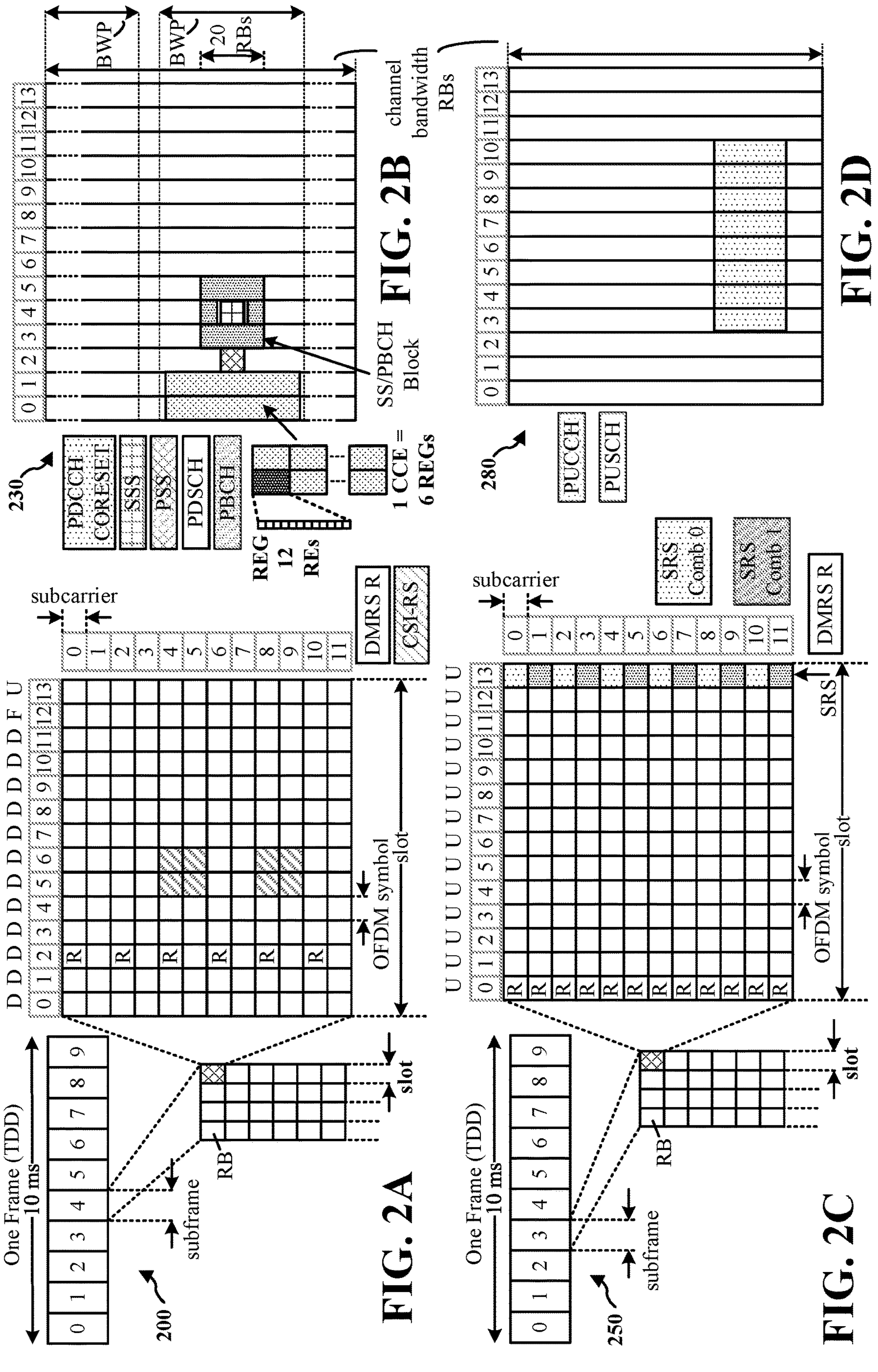
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
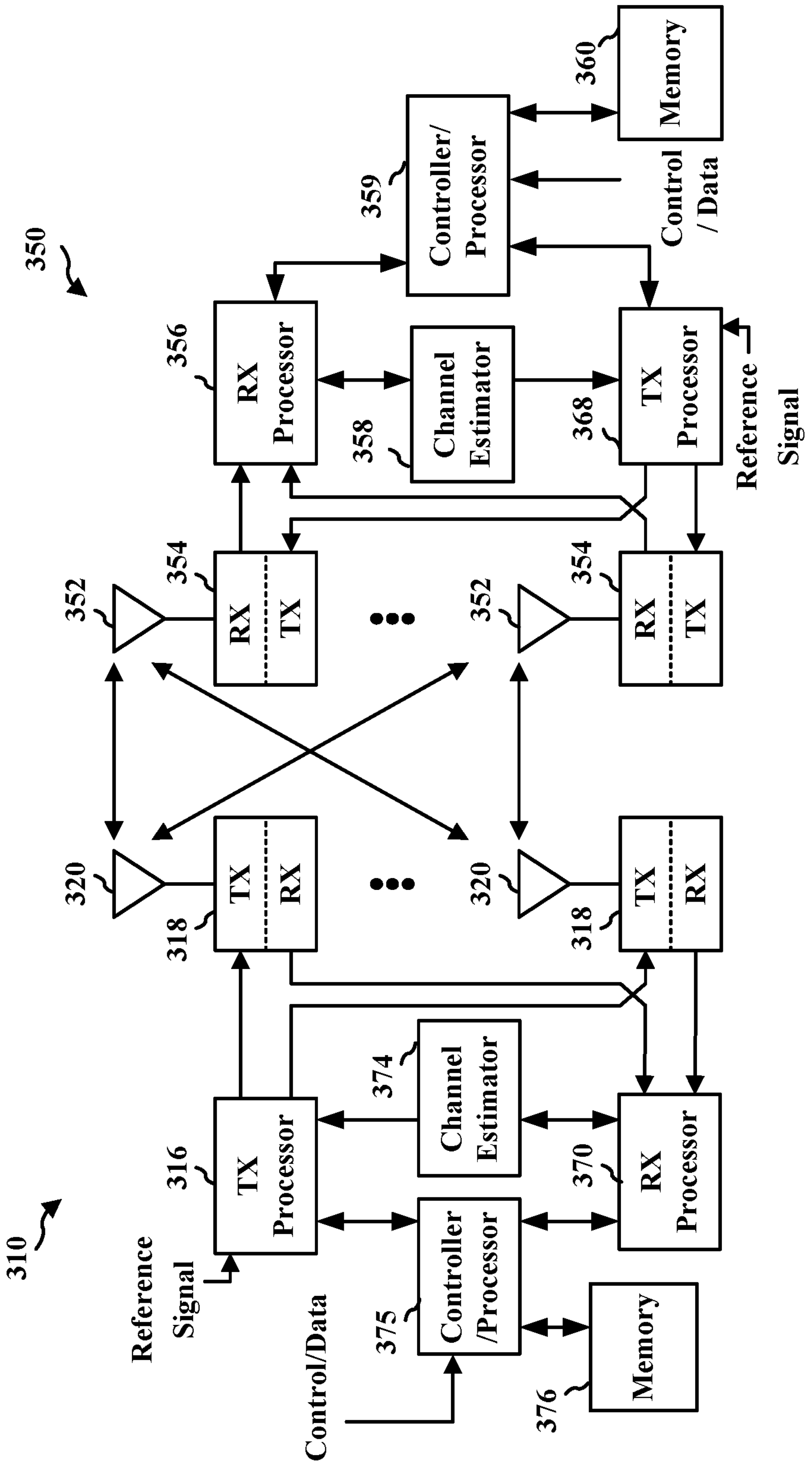
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

In wireless communication systems, such as 5G positioning systems, positioning measurements of a wireless device (e.g., UE) may allow for the position of the wireless device to be calculated. For example, downlink positioning reference signals are reference signals that supports downlink based positioning method. Positioning reference signals are defined for NR positioning to enable UEs to detect and measure positioning reference signals for location determination of the UE. Several configurations may be supported to enable a variety of deployments, such as but not limited to indoor applications, outdoor applications, sub-6 GHZ, or millimeter wave (mmW). Multiple position calculation methods (e.g., UE assisted or UE based) may be supported. For UE-assisted positioning, the UE performs measurements of the positioning reference signals (PRS) and provides the measurements to a location server (e.g., LMF) for the location server to determine or calculate the position of the UE. For UE-based positioning, the UE performs measurements of the positioning reference signals and calculates the position of the UE itself.

Figure 4:
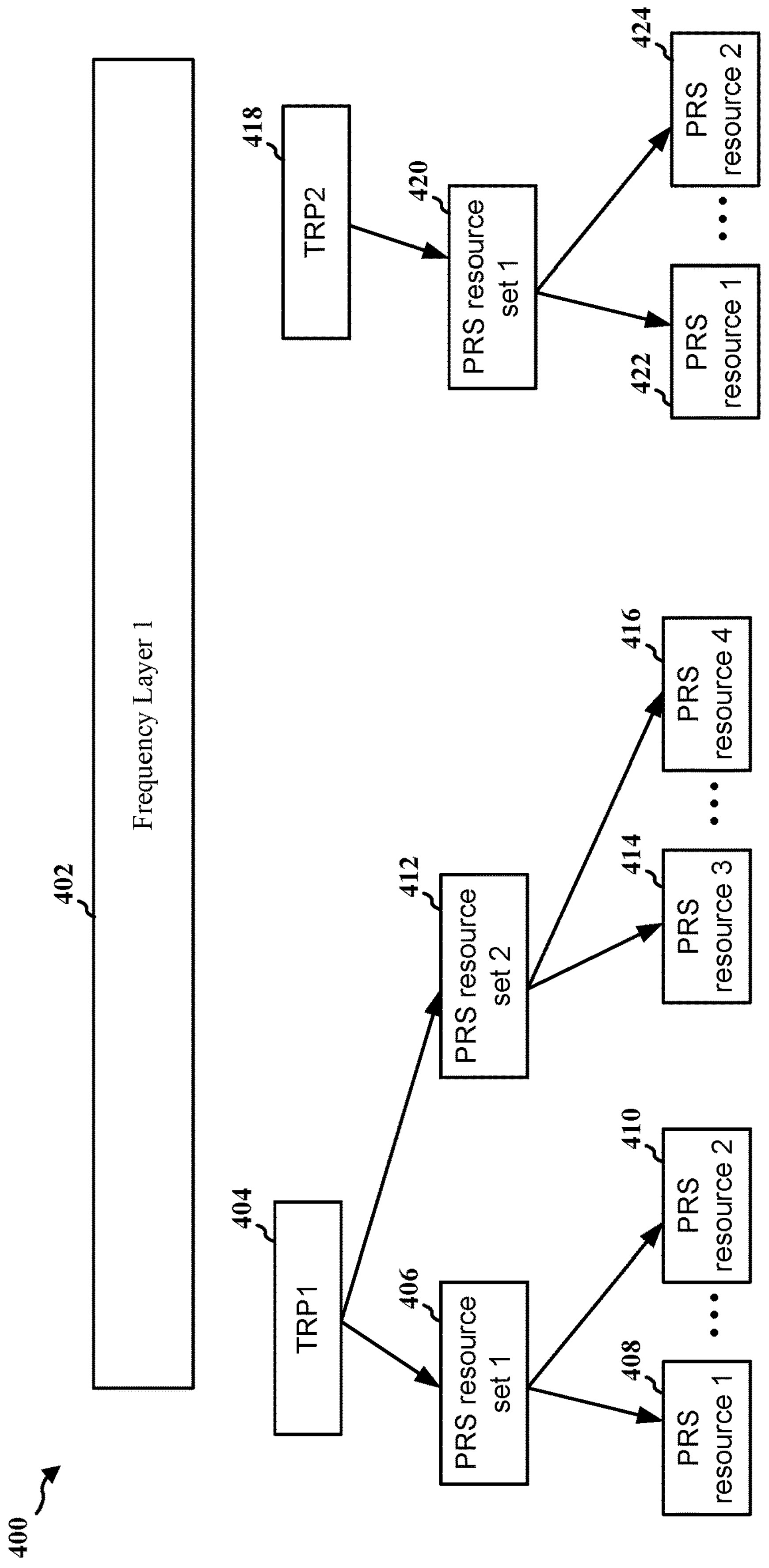
FIG. 4 is a diagram illustrating an example of PRS assistance data.

UEs may be configured to report the capability to process PRS in a capability indication. The UE may receive assistance data from the location server (e.g., LMF) via the base station to perform the PRS measurements. However, the measurements to be measured may exceed the capability of the UE. In such instances, the UE may assume that the PRS resources in the assistance data may be sorted in a decreasing order of measurement priority. For example, with reference to diagram 400 of FIG. 4, a frequency layer 1 402 may comprise a TRP1 404 and a TRP2 418. The TRP1 may comprise a PRS resource set 1 406 and a PRS resource set 2 412, such that the respective PRS resources of the resource sets may be sorted according to priority. For example, the PRS resources may be sorted based on PRS resource 1 408, PRS resource 2 410 of PRS resource set 1 406, and PRS resource 3 414 and PRS resource 4 416 of PRS resource set 2 412. The PRS resource set 1 422 and PRS resource 2 414 of PRS resource set 1 420 may also be sorted based on priority.

Figure 5A:
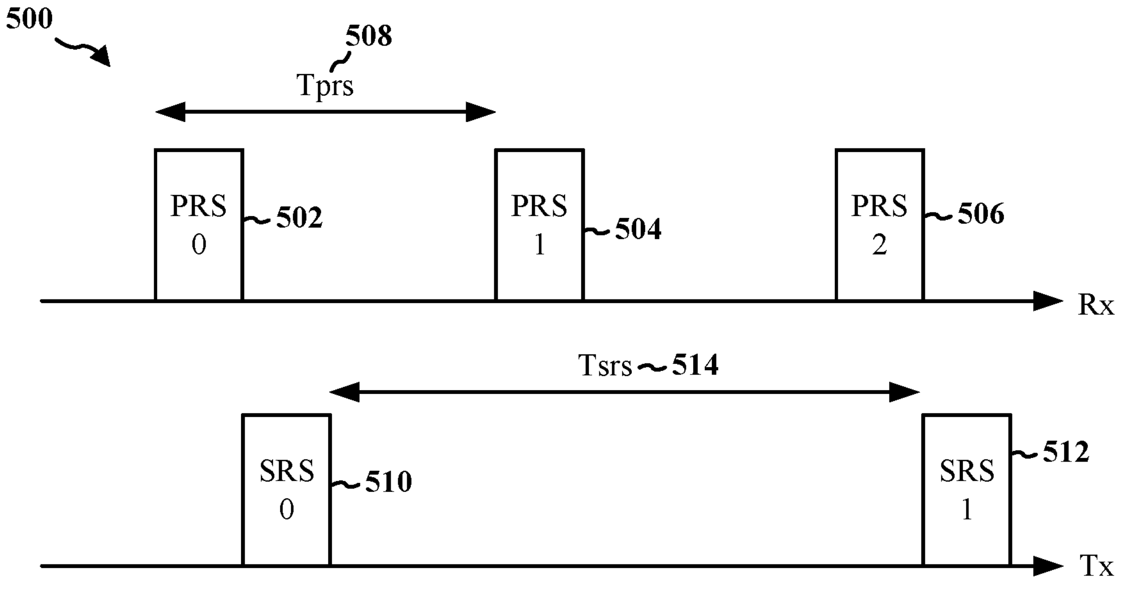
FIG. 5A is a diagram illustrating an example of selection for RX-TX measurements.

The priority assignment in the assistance data may be based on the PRS measurements. The UE may perform PRS measurements and SRS transmission to perform any RX-TX measurements. The location server may not be aware of SRS scheduling of SRS information received in an RRC message. As such, priority of assistance data may not be based on SRS scheduling. In order to get accurate RX-TX measurements, the PRS and SRS should be in close proximity. With reference to diagram 500 of FIG. 5A, the assistance data may comprise a PRS0 502, PRS1 504, and PRS2 506, such that a timing separation Tprs 508 is between each PRS0. The SRS scheduling may comprise SRS0 510 and SRS1 512, such that a timing separation Tsrs 514 is between each SRS. In some instances, the proximity of SRS transmission with PRS may comprise ±25 msec. The measurement of UE RX-TX timing difference may be applicable if the configured parameters SRS-Slot-offset and SRS-Periodicity for SRS resource for positioning are such that any SRS transmission is within [−25, 25] msec of at least one PRS resource of each of the TRPs in the assistance data. The RX-TX timing difference measurement period may apply provided that there is at least one SRS transmission within the measurement period.

Figure 5B:
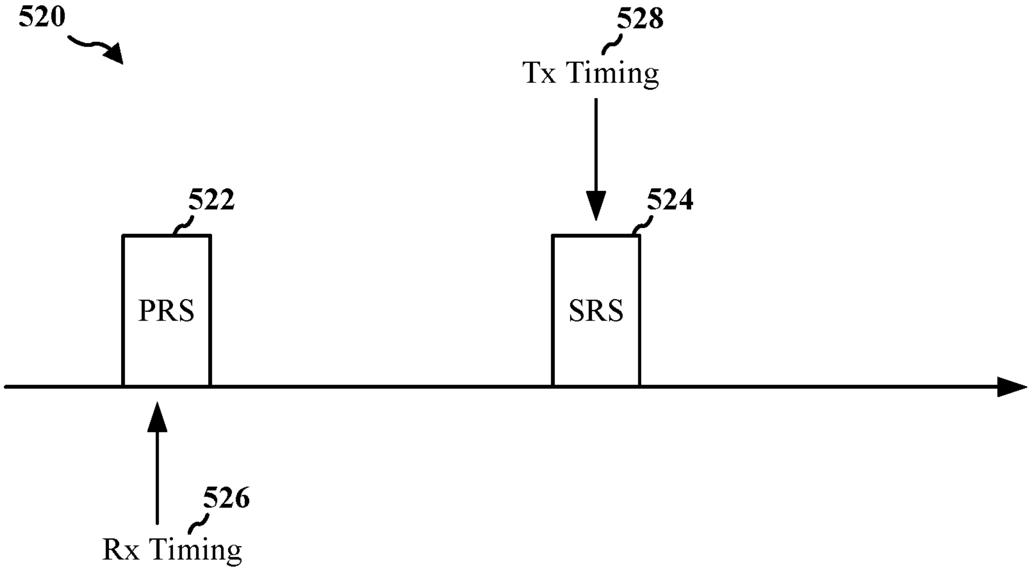
FIG. 5B is a diagram illustrating an example of UE RX-TX.

The UE may include in the UE RX-TX measurement report, associated with each RX-TX measurement, an uplink timestamp. The UE RX-TX time difference may be defined as $T_{UE\text{-}RX}-T_{UE\text{-}TX}$. $T_{UE\text{-}RX}$ is the UE received timing of downlink subframe #i from a transmission point, defined by the first detected path in time. $T_{UE\text{-}TX}$ is the UE transmit timing of uplink subframe #j that is closest in time to the subframe #i received from the transmission point. For example, with reference to diagram 520 of FIG. 5B, the $T_{UE\text{-}TX}$ may correspond to TX timing 528 for SRS 524, and $T_{UE\text{-}RX}$ may correspond to RX timing 526 of PRS 522. TUE-TX may be the UE transmit timing of uplink subframe #j in which the transmission of the associated SRS resource occurred according to the UE RX-TX measurement report. Multiple PRS resources may be used to determine the start of one subframe of the first arrival path of the transmission point. For frequency range 1, the reference point from $T_{UE\text{-}RX}$ measurement may be the RX antenna connector of the UE and the reference point for $T_{UE\text{-}TX}$ measurement may be the TX antenna connector of the UE. For frequency range 2, the reference point for TUE-RX measurement may be the RX antenna of the UE and the reference point for TUE-TX measurement may be the TX antenna of the UE.

Aspects presented herein provide a configuration for optimizing the reporting of Uu-RTT or SL-RTT measurements. For example, a UE may be configured to identify at least one uplink resource within a proximity window to calculate a reception-transmission time difference. At least one advantage of the disclosure is that a UE may refer to all SRS occasions within the proximity window to calculate the UE RX-TX difference, which may improve performance or allow for an enhance manner to account for timing drift. At least another advantage of the disclosure is that a reporting range of UE RX-TX may be more than ±0.5 msec.

Figure 6:
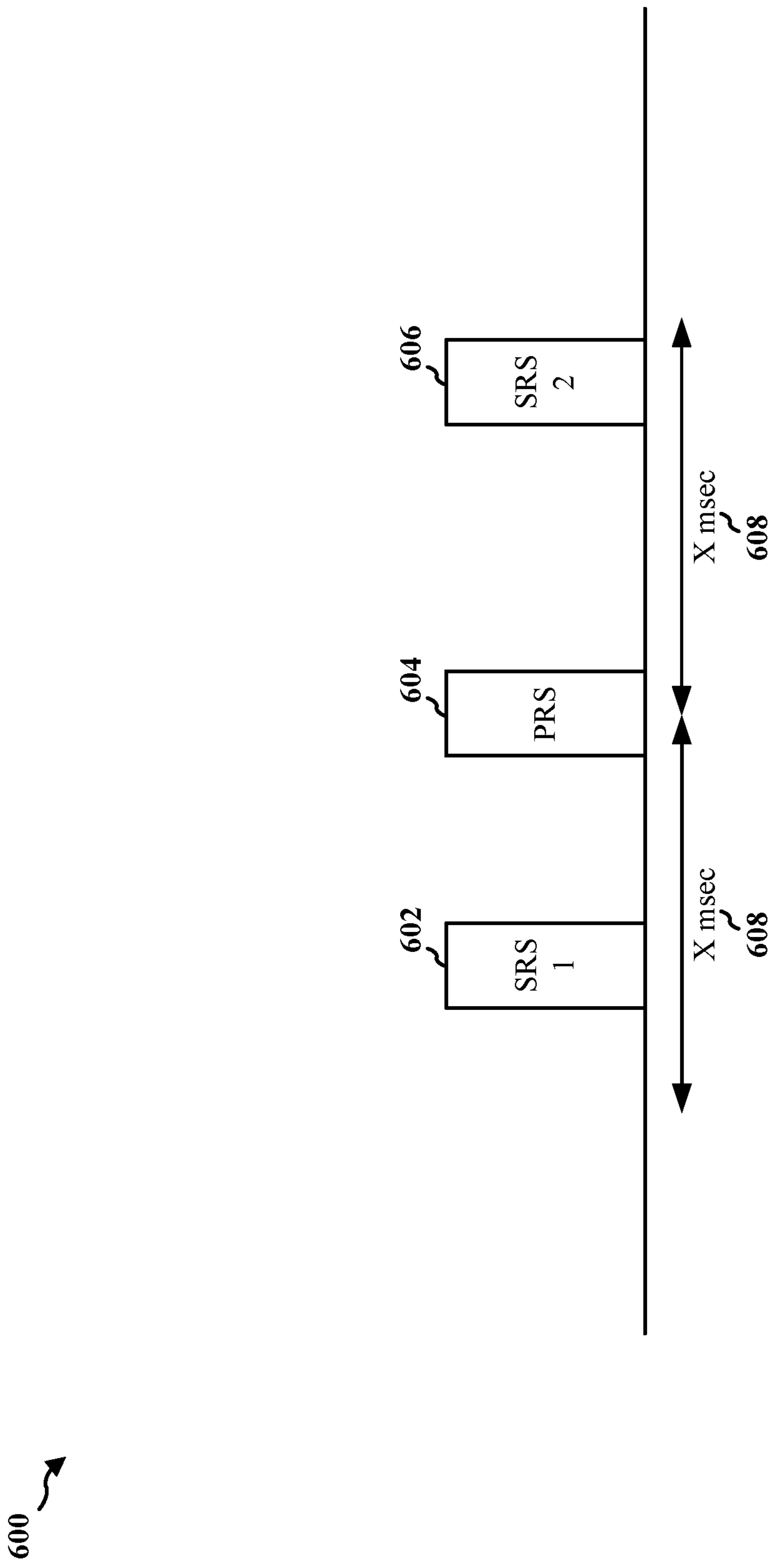
FIG. 6 is a diagram illustrating an example of PRS and SRS scheduling.

FIG. 6 is a diagram 600 illustrating an example of PRS and SRS scheduling. The diagram 600 comprises SRS1 602, PRS 604, and SRS2 606. For every PRS resource (e.g., 604), the UE may look into a range of {−X msec to X msec} to find any suitable SRS to perform the UE RX-TX difference. The proximity window may comprise the range of {−X msec 608 to X msec 608} around the PRS 604. The parameter X is the PRS-SRS proximity parameter that may be predefined or may be sent by the location server (e.g., LMF) to the UE. In some aspects, the parameter X may comprise the values of 25 msec, 40 msec, 80 msec, or 160 msec. The SRS may be before or after the scheduling of PRS. There may be one or more SRS in the proximity window. In some aspects, only one SRS may be within the proximity window, such that the UE RX-TX difference may be determined by using the TX-timing of the slot where the SRS occurs. In some aspects, multiple SRS may be within the proximity window, such that UE RX-TX difference may be determined by using the SRS which is closest in time with respect to the PRS.

Figure 7A:
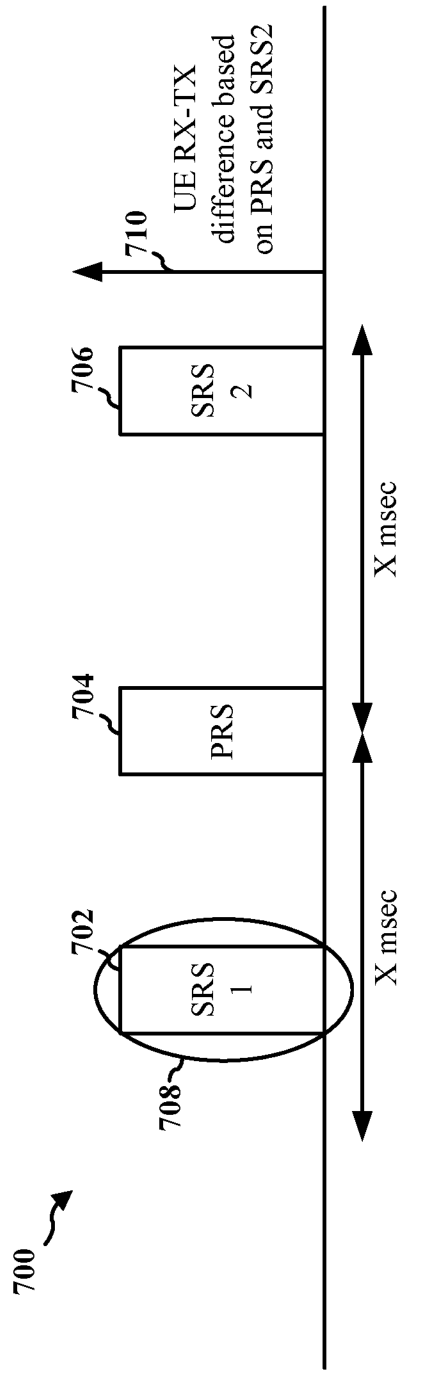
FIG. 7A is a diagram illustrating an example of multiple SRS within a proximity window.
Figure 7B:
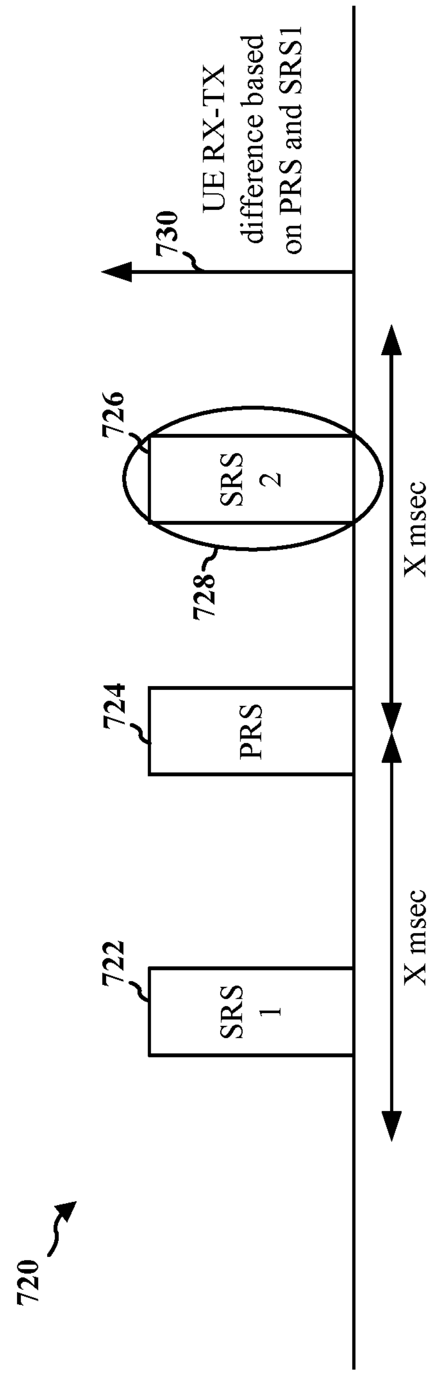
FIG. 7B is a diagram illustrating an example of multiple SRS within a proximity window.

FIGS. 7A and 7B are diagrams 700, 720 illustrating examples of multiple SRS within the proximity window. The diagram 700 comprises SRS1 702, PRS 704, and SRS2 706. SRS1 702 may be closer, in time, to PRS 704 than SRS2 706 is to PRS 704. However, SRS1 702 is missed and not transmitted by the UE (e.g., as shown at 708). The UE may be aware of the scheduling of SRS2 706 in the future, such that the UE may hold the PRS results and determine the UE RX-TX difference 710 based on SRS2 706. How much and whether the UE may hold onto the time of arrival (TOA) measurement of PRS may be specified, UE capability, or related to the configured response time (e.g., instance when UE needs to report the measurements).

The diagram 720 comprises SRS1 722, PRS 724, and SRS2 726. SRS2 726 may be closer, in time, to PRS 724 than SRS1 722 is to PRS 724. SRS1 722 may be transmitted, while SRS2 726 is missed and not transmitted by the UE (e.g., as shown at 728). In such instances, the UE may keep the SRS1 722 uplink timing during the proximity window. The UE may determine the RX-TX difference 730 based on SRS1 722, after the UE determines that the transmission of SRS2 726 was missed. How much and whether the UE may hold the RX-TX measurement derived based on PRS 724 and SRS1 722 may be specified, UE capability, or related to the configured response time (e.g., instance when UE needs to report the measurements).

Figure 8A:
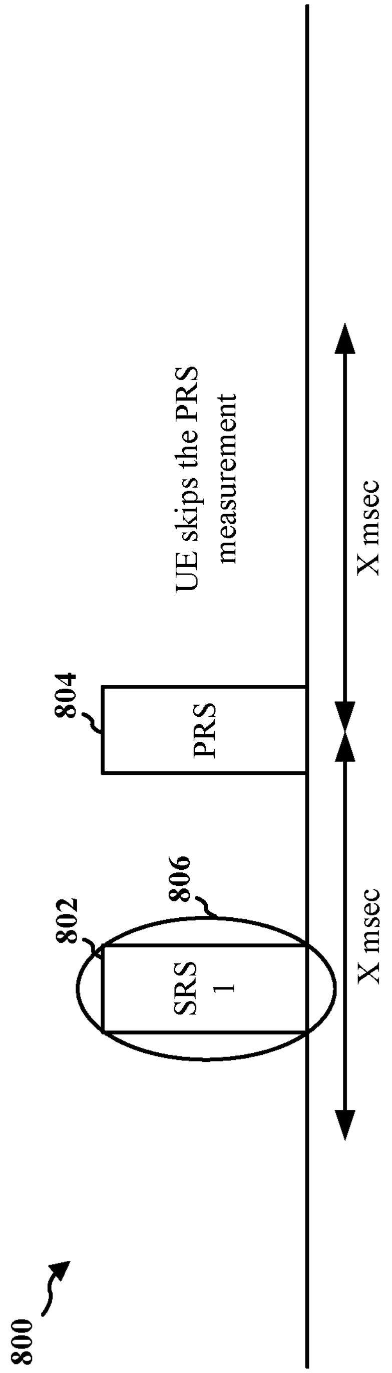
FIG. 8A is a diagram illustrating an example of a single SRS within a proximity window.
Figure 8B:
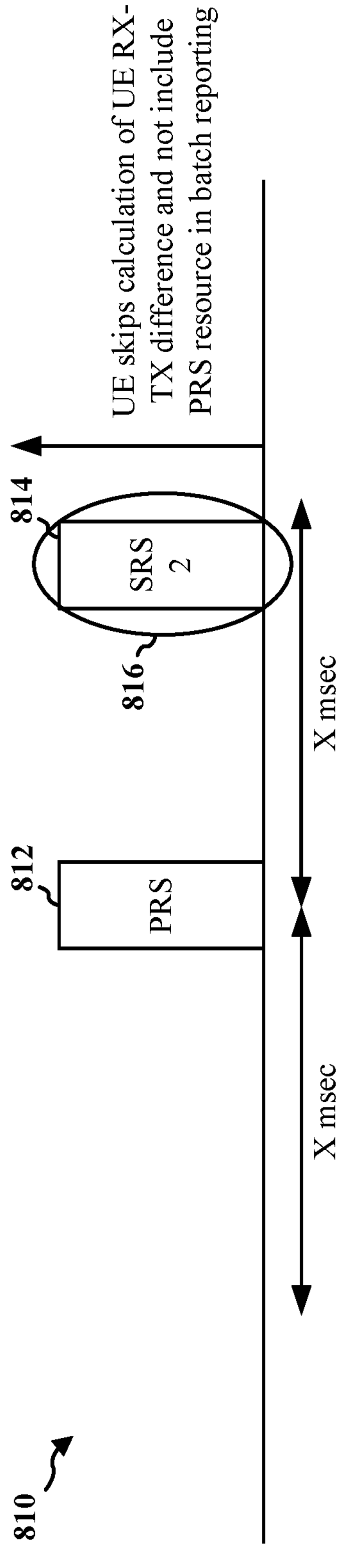
FIG. 8B is a diagram illustrating an example of a single SRS within a proximity window.

FIGS. 8A and 8B are diagrams 800, 810 illustrating examples of a single SRS within the proximity window. The diagram 800 comprises SRS1 802 and PRS 804. SRS1 802 may be missed and not transmitted by the UE (e.g., as shown at 806). The UE may skip the PRS measurement and save power. The UE may not determine the RX-TX difference and may not report accordingly.

The diagram 810 comprises PRS 812 and SRS2 814. SRS2 may be missed and not transmitted by the UE (e.g., as shown at 816). The UE may have already done the PRS measurement (e.g., TOA computation) for PRS 812 by the time that SRS2 814 is scheduled to occur. However, the UE may skip the RX-TX computation since the UE observed that SRS2 814 was missed, such that the UE may not report the PRS 812 in the measurement report.

Figure 9A:
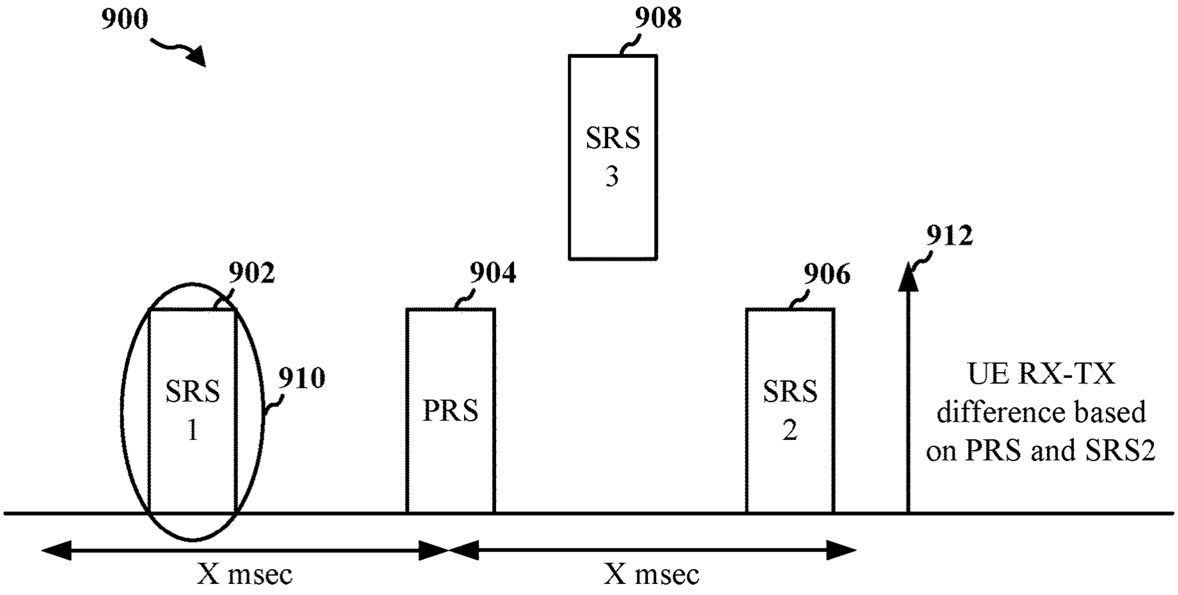
FIG. 9A is a diagram illustrating an example of multiple SRS within a proximity window.
Figure 9B:
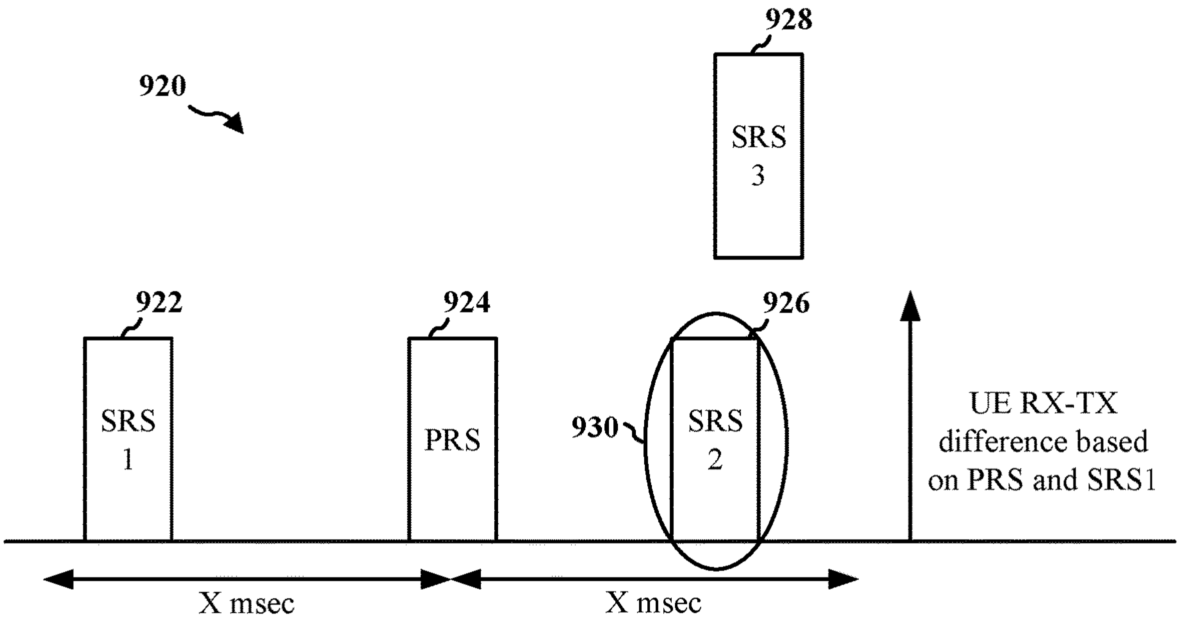
FIG. 9B is a diagram illustrating an example of multiple SRS within a proximity window.

FIGS. 9A and 9B are diagrams 900, 920 illustrating examples of multiple SRS across multiple CCs/bands within the proximity window. The diagram 900 comprises SRS1 902, PRS 904, SRS2 906, and SRS3 908. SRS1 902 may be closer, in time, to PRS 904 than SRS2 906 and SRS3 908, where SRS3 908 may be in a different CC or band. SRS1 902 may be missed and not transmitted by the UE (e.g., as shown at 910). The UE may be aware of the scheduling of SRS2 906 and SRS3 908 in the future, such that the UE may hold the PRS results and determine the UE RX-TX difference 912 based on SRS2 906, or based on SRS3 908, even if SRS3 908 is in a different CC/band. The UE may consider the errors introduced by the inter-band/inter-CC RX-TX being smaller than the corresponding error introduced by a late SRS transmission.

The diagram 920 comprises SRS1 922, PRS 924, SRS2 926, and SRS3 928. SRS2 926 may be closer, in time, to PRS 904 than SRS1 922. SRS1 922 may be transmitted, while the transmission of SRS2 926 may be missed by the UE, and SRS3 928 may be transmitted by the UE but on a different band/CC. The UE may keep the SRS1 922 uplink timing within the proximity window. The UE may determine to either calculate the RX-TX difference based on SRS1 922, or calculate the RX-TX difference based on SRS3 928. The decision may be related to the proximity of SRS1 922 to PRS 924 and SRS3 928-PRS 924, and an error that may be introduced by calculating the RX-TX difference based on SRS3 928.

Figure 10:
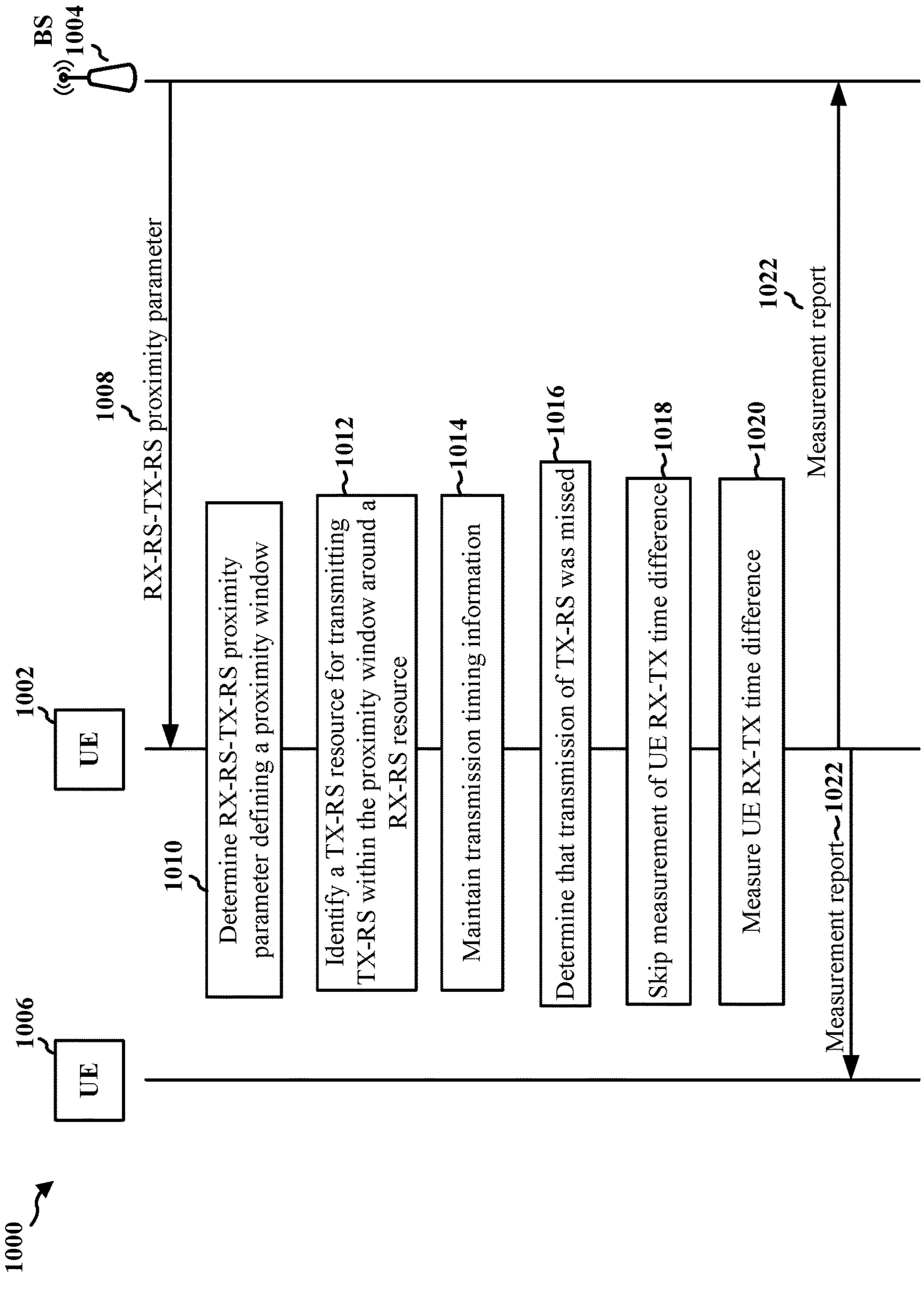
FIG. 10 is a call flow diagram of signaling between a UE and a base station.

FIG. 10 is a call flow diagram 1000 of signaling between a UE 1002 and a base station 1004. The base station 1004 may be configured to provide at least one cell. The UE 1002 may be configured to communicate with the base station 1004. For example, in the context of FIG. 1, the base station 1004 may correspond to base station 102/180 and, accordingly, the cell may include a geographic coverage area 110 in which communication coverage is provided and/or small cell 102' having a coverage area 110'. Further, a UE 1002 may correspond to at least UE 104. In another example, in the context of FIG. 3, the base station 1004 may correspond to base station 310 and the UE 1002 may correspond to UE 350.

At 1008, the UE 1002 may receive a configuration comprising an RX-RS-TX-RS proximity parameter. The UE 1002 may receive the configuration comprising the RX-RS-TX-RS proximity parameter from the base station 1004. In some aspects, a location server (e.g., LMF) (not shown) may provide the RX-RS-TX-RS proximity parameter to the UE 1002 via the base station 1004.

At 1010, the UE 1002 may determine the RX-RS-TX-RS proximity parameter defining a proximity window around an RX-RS resource for receiving an RX-RS. The UE 1002 may determine the RX-RS-TX-RS proximity parameter based on the configuration comprising the RX-RS-TX-RS proximity parameter.

At 1012, the UE 1002 may identify a TX-RS resource of at least one TX-RS resource for transmitting TX-RS within a proximity window around a RX-RS resource for receiving RX-RS. In some aspects, the at least one TX-RS resource may comprise one TX-RS resource. In such instances, the one TX-RS resource may be identified for determining the UE RX-TX time difference. In some aspects, the at least one TX-RS resource may comprise a plurality of TX-RS resources. In such instances, a closest TX-RS resource of the plurality of TX-RS resources may be identified for determining the UE RX-TX time difference. The closest TX-RS resource may be closest in time to the RX-RS resource used for the determining the UE RX-TX time difference. In some aspects, the at least one TX-RS resource may comprise a plurality of TX-RS resources. In such instances, a closest TX-RS resource of the plurality of TRS resources in which TX-RS is transmitted in the TX-RS resource may be identified for determining the UE RX-TX time difference. The closest TX-RS resource may be closest in time to the RX-RS resource used for the determining the UE RX-TX time difference. In some aspects, identifying the TX-RS resource of the at least one TX-RS resource of for transmitting the TX-RS within the proximity window may be based at least on a TX-RS resource band or CC.

At 1014, the UE 1002 may maintain transmission timing information associated with transmission of TX-RS in the first TX-RS resource. In some aspects, the plurality of TX-RS resources may comprise a first TX-RS resource that may be before the RX-RS resource and a second TX-RS resource that may be after the RX-RS resource. The second TX-RS resource may be closer in time to the RX-RS resource than the first TS-RS resource.

At 1016, the UE 1002 may determine that transmission of TX-RS was missed. For example, the UE 1002 may determine that transmission of TX-RS in a first TX-RS resource was missed. In some aspects, the plurality of TX-RS resources may comprise a first TX-RS resource before the RX-RS resource and a second TX-RS resource after the RX-RS resource. The first TX-RS resource may be closer in time to the RX-RS resource than the second TX-RS resource. In instances where the UE 1002 determines that the transmission of the TX-RS in the first TX-RS resource was missed, the second TX-RS resource may be identified for determining the UE RX-TX time difference.

In some aspects, the at least one TX-RS resource may comprise a first TX-RS resource, a second TX-RS resource, and a third TX-RS resource. The first TX-RS resource may be before the RX-RS resource and may be closer to the RX-RS resource than the second TX-RS resource and the third TX-RS resource, while the second TX-RS resource and the third TX-RS resource may be after the RX-RS resource. The third TX-RS resource may be in a different CC or band and may be closer to the RX-RS resource than the second TX-RS resource. In such instances where the UE determines that the transmission of the TX-RS in the first TX-RS resource was missed, at least one of the second TX-RS resource or the third TX-RS resource may be identified as the TX-RS resource for determining the UE RX-TX time difference.

In some aspects, the UE 1002 may determine that transmission of TX-RX in the second TX-RS resource was missed. In such instances, the first TX-RS resource may be identified for determining the UE RX-TX time difference. A measured UE RX-TX time difference may be based on the maintained transmission timing information.

In some aspects, the UE 1002 may determine that transmission of the TX-RS in the identified TX-RS resource was missed. In some aspects, the at least one TX-RS resource may comprise one TX-RS resource.

In some aspects, the UE 1002 may determine that transmission of the TX-RS in a second TX-RS resource was missed. In some aspects, the at least one TX-RS resource may comprise a first TX-RS resource, a second TX-RS resource, and a third TX-RS resource. The first TX-RS resource may be before the RX-RS resource, while the second TX-RS resource and the third TX-RS resource may be after the RX-RS resource. The second TX-RS resource may be closer to the RX-RS resource than the first TX-RS resource and the third TX-RS resource. The third TX-RS resource may be in a different CC or band and may be closer to the RX-RS resource than the first TX-RS resource. In instances where the UE determines that the transmission of the TX-RS in the second TX-RS resource was missed, one of the first TX-RS resource or the third TX-RS resource may be identified as the TX-RS resource for determining the UE RX-TX time difference.

At 1018, the UE 1002 may skip the measurement of the UE RX-TX time difference. The UE 1002 may skip the measurement of the UE RX-TX time difference based on the determination that the transmission of the TX-RS in the identified TX-RS resource was missed.

At 1020, the UE 1002 may measure the UE RX-TX time difference. The UE 1002 may measure the UE RX-TX time difference based on a received RX-RS in the RX-RS resource and a transmitted TX-RS in the identified TX-RS resource when TX-RS is transmitted in the identified TX-RS resource.

At 1022, the UE 1002 may transmit a measurement report including information indicating the identified TX-RS resource, the RX-RS resource, and the measured UE RX-TX time difference. The UE 1002 may transmit the measurement report to a wireless communication device. In some aspects, the wireless communication device may comprise a base station 1004. The RX-RS may comprise downlink (DL) position reference signals (PRS), the RX-RS resource may comprise a DL PRS resource, the TX-RS may comprise sounding reference signals (SRS), and the TX-RS resource may comprise a SRS resource. In some aspects, a measured UE RX-TX time difference may be based on a UE RX timing of a received PRS and a TX timing of a slot or subframe associated with a transmitted SRS in an identified SRS resource. In some aspects, the wireless communication device may comprise a second UE 1006. In such instances, the RX-RS may comprise sidelink position reference signals (SL-PRS), the RX-RS resource may comprise an SL-PRS resource, the TX-RS may comprise SL sounding reference signals (SL-SRS), and the TX-RS resource may comprise an SL-SRS resource. In some aspects, a measured UE RX-TX time difference may be based on a UE RX timing of a received SL-PRS and a TX timing of a slot or subframe associated with a transmitted SL-SRS in an identified SL-SRS resource.

Figure 11:
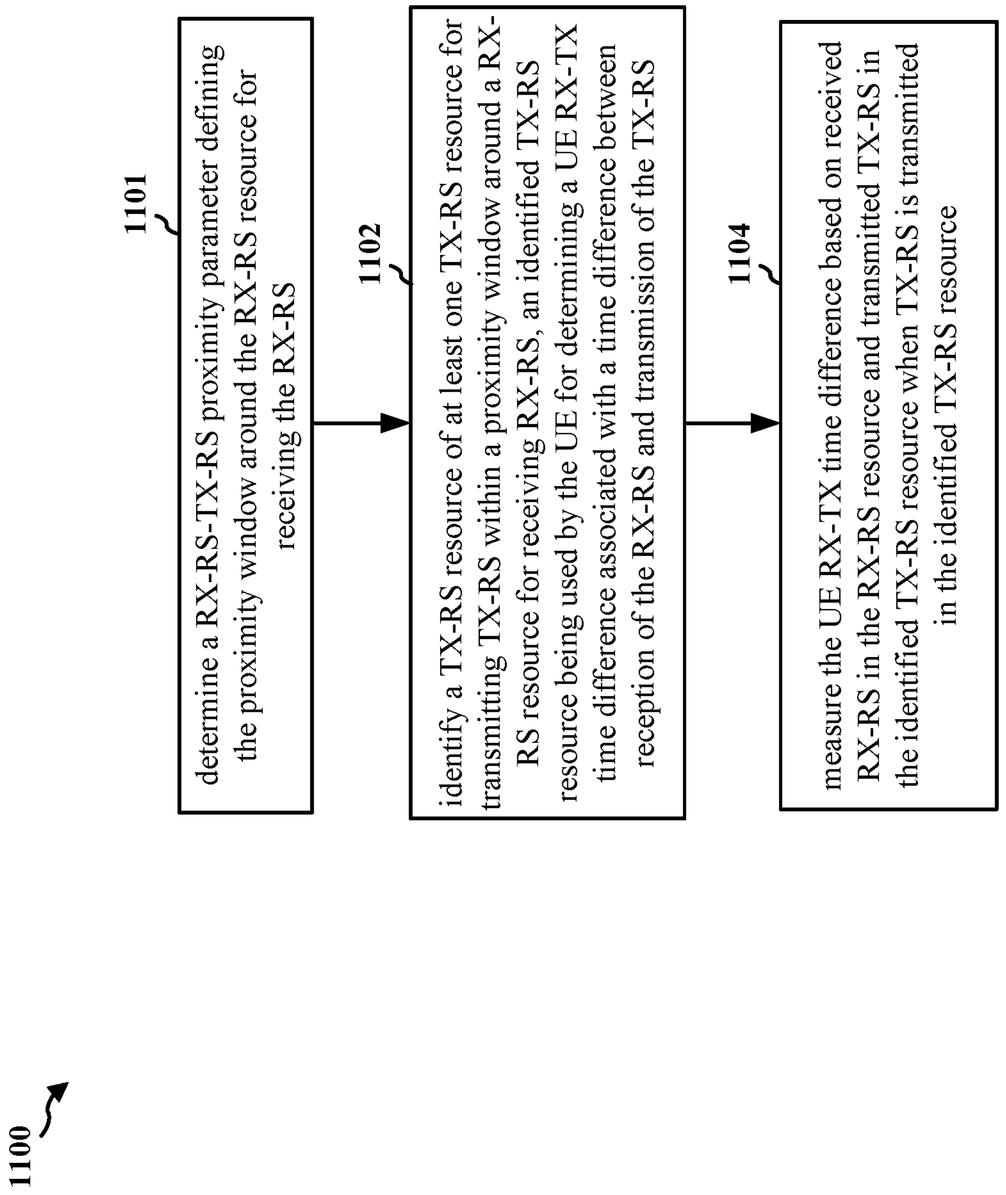
FIG. 11 is a flowchart of a method of wireless communication.

FIG. 11 is a flowchart 1100 of a method of wireless communication. The method may be performed by a UE or a component of a UE (e.g., the UE 104; the apparatus 1302; the cellular baseband processor 1304, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to refer to one or more uplink resources within a proximity window to calculate a reception-transmission time difference.

At 1101, the UE may determine the RX-RS-TX-RS proximity parameter defining a proximity window around an RX-RS resource for receiving an RX-RS. For example, 1101 may be performed by parameter component 1340 of apparatus 1302. The UE may determine the RX-RS-TX-RS proximity parameter based on the configuration comprising the RX-RS-TX-RS proximity parameter.

At 1102, the UE may identify a TX-RS resource of at least one TX-RS resource for transmitting TX-RS within a proximity window around a RX-RS resource for receiving RX-RS. For example, 1102 may be performed by identification component 1342 of apparatus 1302. In some aspects, the at least one TX-RS resource may comprise one TX-RS resource. In such instances, the one TX-RS resource may be identified for determining the UE RX-TX time difference. In some aspects, the at least one TX-RS resource may comprise a plurality of TX-RS resources. In such instances, a closest TX-RS resource of the plurality of TX-RS resources may be identified for determining the UE RX-TX time difference. The closest TX-RS resource may be closest in time to the RX-RS resource used for the determining the UE RX-TX time difference. In some aspects, the at least one TX-RS resource may comprise a plurality of TX-RS resources. In such instances, a closest TX-RS resource of the plurality of TRS resources in which TX-RS is transmitted in the TX-RS resource may be identified for determining the UE RX-TX time difference. The closest TX-RS resource may be closest in time to the RX-RS resource used for the determining the UE RX-TX time difference. In some aspects, identifying the TX-RS resource of the at least one TX-RS resource of for transmitting the TX-RS within the proximity window may be based at least on a TX-RS resource band or component carrier (CC).

At 1104, the UE may measure the UE RX-TX time difference. For example, 1104 may be performed by measurement component 1348 of apparatus 1302. The UE may measure the UE RX-TX time difference based on received RX-RS in the RX-RS resource and transmitted TX-RS in the identified TX-RS resource when TX-RS is transmitted in the identified TX-RS resource.

Figure 12:
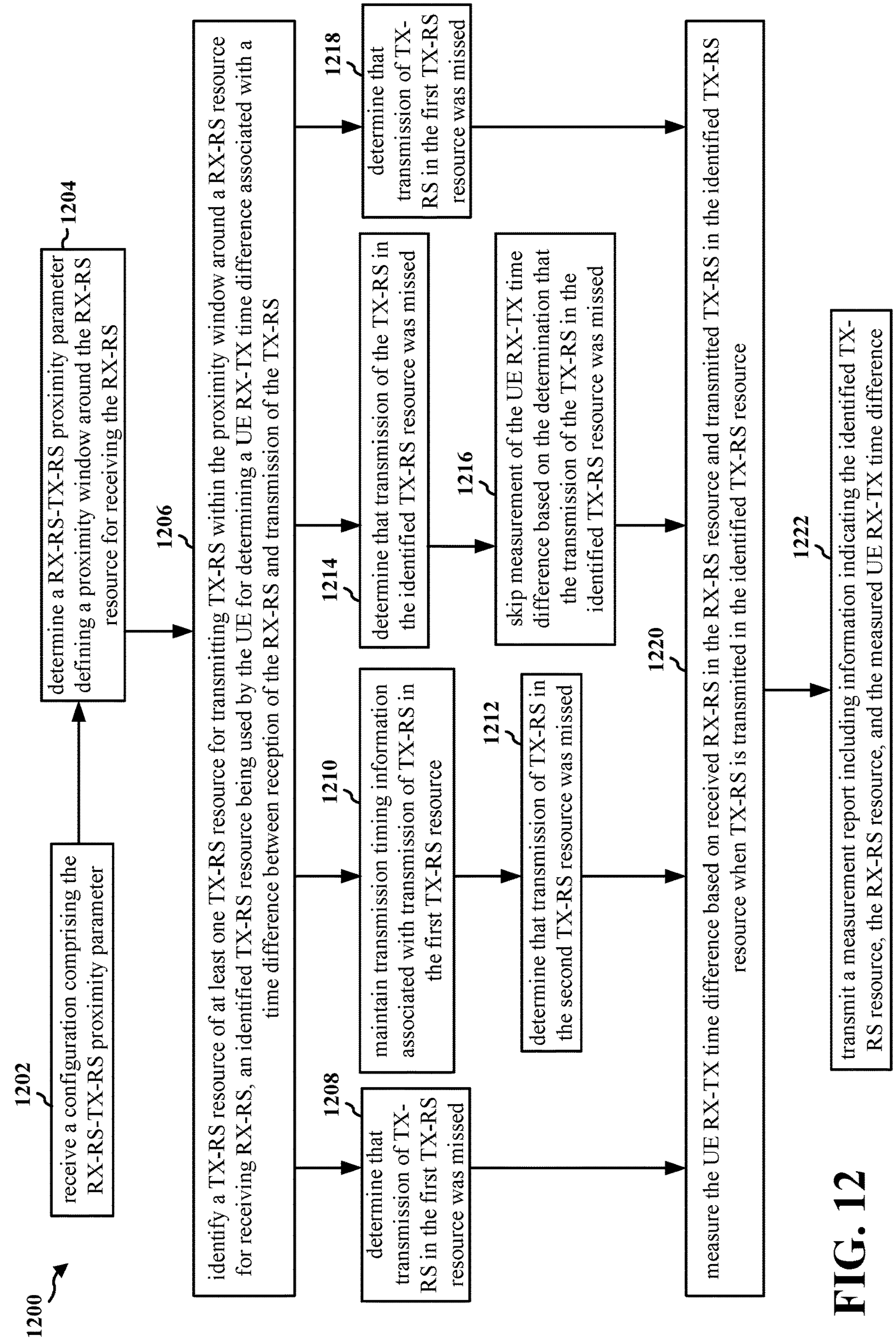
FIG. 12 is a flowchart of a method of wireless communication.

FIG. 12 is a flowchart 1200 of a method of wireless communication. The method may be performed by a UE or a component of a UE (e.g., the UE 104; the apparatus 1302; the cellular baseband processor 1304, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to refer to one or more uplink resources within a proximity window to calculate a reception-transmission time difference.

At 1202, the UE may receive a configuration comprising an RX-RS-TX-RS proximity parameter. For example, 1202 may be performed by parameter component 1340 of apparatus 1302.

At 1204, the UE may determine the RX-RS-TX-RS proximity parameter defining a proximity window around an RX-RS resource for receiving an RX-RS. For example, 1204 may be performed by parameter component 1340 of apparatus 1302. The UE may determine the RX-RS-TX-RS proximity parameter based on the configuration comprising the RX-RS-TX-RS proximity parameter.

At 1206, the UE may identify a TX-RS resource of at least one TX-RS resource for transmitting TX-RS within a proximity window around a RX-RS resource for receiving RX-RS. For example, 1206 may be performed by identification component 1342 of apparatus 1302. In some aspects, the at least one TX-RS resource may comprise one TX-RS resource. In such instances, the one TX-RS resource may be identified for determining the UE RX-TX time difference. In some aspects, the at least one TX-RS resource may comprise a plurality of TX-RS resources. In such instances, a closest TX-RS resource of the plurality of TX-RS resources may be identified for determining the UE RX-TX time difference. The closest TX-RS resource may be closest in time to the RX-RS resource used for the determining the UE RX-TX time difference. In some aspects, the at least one TX-RS resource may comprise a plurality of TX-RS resources. In such instances, a closest TX-RS resource of the plurality of TRS resources in which TX-RS is transmitted in the TX-RS resource may be identified for determining the UE RX-TX time difference. The closest TX-RS resource may be closest in time to the RX-RS resource used for the determining the UE RX-TX time difference. In some aspects, identifying the TX-RS resource of the at least one TX-RS resource of for transmitting the TX-RS within the proximity window may be based at least on a TX-RS resource band or CC.

At 1208, the UE may determine that transmission of TX-RS in a first TX-RS resource was missed. For example, 1208 may be performed by determination component 1344 of apparatus 1302. In some aspects, the plurality of TX-RS resources may comprise a first TX-RS resource before the RX-RS resource and a second TX-RS resource after the RX-RS resource. The first TX-RS resource may be closer in time to the RX-RS resource than the second TX-RS resource. In instances where the UE determines that the transmission of the TX-RS in the first TX-RS resource was missed, the second TX-RS resource may be identified for determining the UE RX-TX time difference.

In some aspects, the at least one TX-RS resource may comprise a first TX-RS resource, a second TX-RS resource, and a third TX-RS resource. The first TX-RS resource may be before the RX-RS resource and may be closer to the RX-RS resource than the second TX-RS resource and the third TX-RS resource, while the second TX-RS resource and the third TX-RS resource may be after the RX-RS resource. The third TX-RS resource may be in a different CC or band and may be closer to the RX-RS resource than the second TX-RS resource. In such instances where the UE determines that the transmission of the TX-RS in the first TX-RS resource was missed, at least one of the second TX-RS resource or the third TX-RS resource may be identified as the TX-RS resource for determining the UE RX-TX time difference.

At 1210, the UE may maintain transmission timing information associated with transmission of TX-RS in the first TX-RS resource. For example, 1210 may be performed by timing component 1346 of apparatus 1302. In some aspects, the plurality of TX-RS resources may comprise a first TX-RS resource that may be before the RX-RS resource and a second TX-RS resource that may be after the RX-RS resource. The second TX-RS resource may be closer in time to the RX-RS resource than the first TS-RS resource.

At 1212, the UE may determine that transmission of TX-RX in the second TX-RS resource was missed. For example, 1212 may be performed by determination component 1344 of apparatus 1302. In such instances, the first TX-RS resource may be identified for determining the UE RX-TX time difference. A measured UE RX-TX time difference may be based on the maintained transmission timing information.

At 1214, the UE may determine that transmission of the TX-RS in the identified TX-RS resource was missed. For example, 1214 may be performed by determination component 1344 of apparatus 1302. In some aspects, the at least one TX-RS resource may comprise one TX-RS resource.

At 1216, the UE may skip the measurement of the UE RX-TX time difference. For example, 1216 may be performed by measurement component 1348 of apparatus 1302. The UE may skip the measurement of the UE RX-TX time difference based on the determination that the transmission of the TX-RS in the identified TX-RS resource was missed.

At 1218, the UE may determine that transmission of the TX-RS in a second TX-RS resource was missed. For example, 1218 may be performed by determination component 1344 of apparatus 1302. In some aspects, the at least one TX-RS resource may comprise a first TX-RS resource, a second TX-RS resource, and a third TX-RS resource. The first TX-RS resource may be before the RX-RS resource, while the second TX-RS resource and the third TX-RS resource may be after the RX-RS resource. The second TX-RS resource may be closer to the RX-RS resource than the first TX-RS resource and the third TX-RS resource. The third TX-RS resource may be in a different CC or band and may be closer to the RX-RS resource than the first TX-RS resource. In instances where the UE determines that the transmission of the TX-RS in the second TX-RS resource was missed, one of the first TX-RS resource or the third TX-RS resource may be identified as the TX-RS resource for determining the UE RX-TX time difference.

At 1220, the UE may measure the UE RX-TX time difference. For example, 1220 may be performed by measurement component 1348 of apparatus 1302. The UE may measure the UE RX-TX time difference based on a received RX-RS in the RX-RS resource and a transmitted TX-RS in the identified TX-RS resource when TX-RS is transmitted in the identified TX-RS resource.

At 1222, the UE may transmit a measurement report including information indicating the identified TX-RS resource, the RX-RS resource, and the measured UE RX-TX time difference. For example, 1222 may be performed by report component 1350 of apparatus 1302. The UE may transmit the measurement report to a wireless communication device. In some aspects, the wireless communication device may comprise a base station. The RX-RS may comprise DL PRS, the RX-RS resource may comprise a DL PRS resource, the TX-RS may comprise SRS, and the TX-RS resource may comprise a SRS resource. In some aspects, a measured UE RX-TX time difference may be based on a UE RX timing of a received PRS and a TX timing of a slot or subframe associated with a transmitted SRS in an identified SRS resource. In some aspects, the wireless communication device may comprise a second UE. In such instances, the RX-RS may comprise SL-PRS, the RX-RS resource may comprise an SL-PRS resource, the TX-RS may comprise SL-SRS, and the TX-RS resource may comprise an SL-SRS resource. In some aspects, a measured UE RX-TX time difference may be based on a UE RX timing of a received SL-PRS and a TX timing of a slot or subframe associated with a transmitted SL-SRS in an identified SL-SRS resource.

Figure 13:
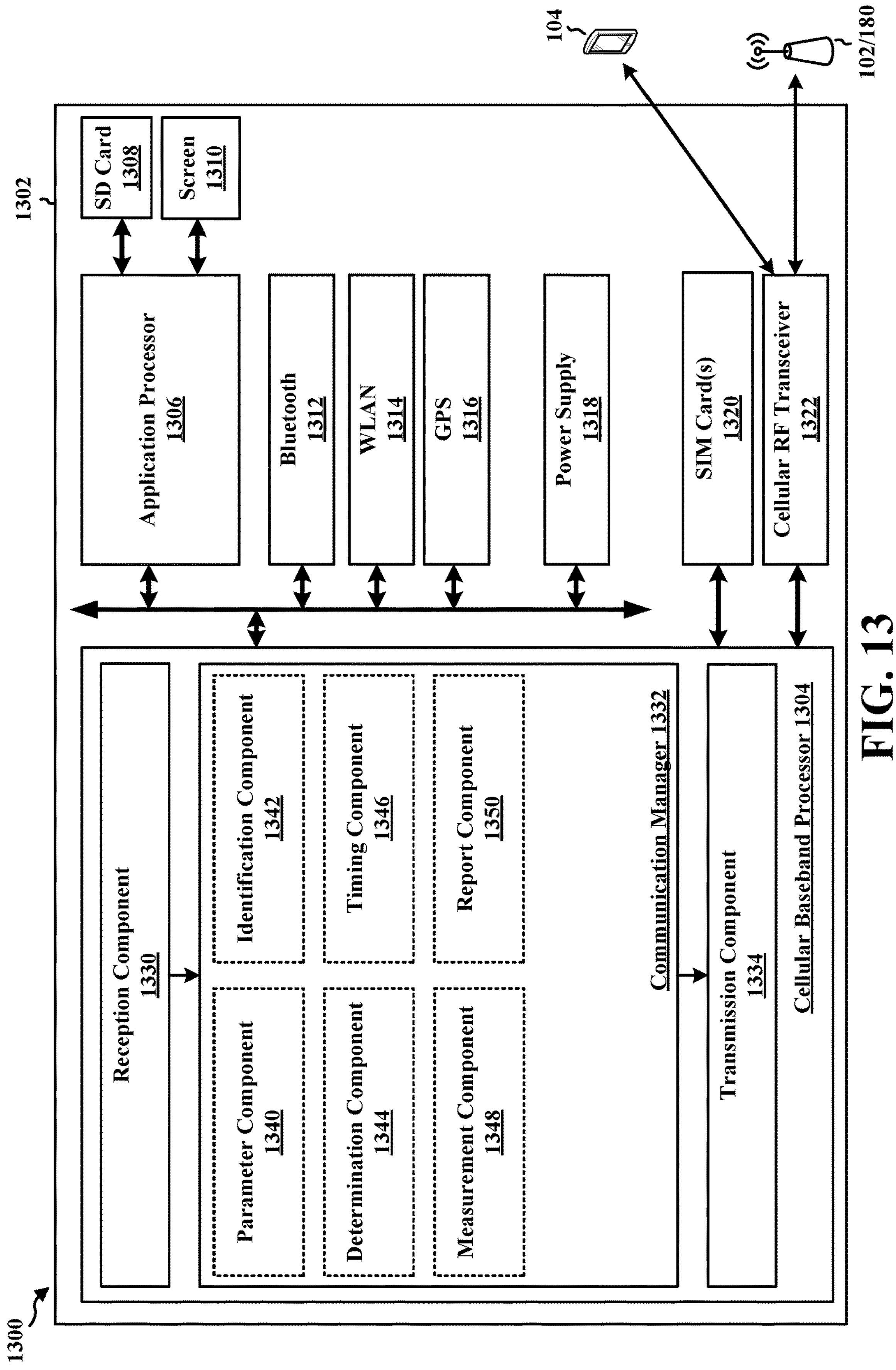
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., sec 350 of FIG. 3) and include the additional modules of the apparatus 1302.

The communication manager 1332 includes a parameter component 1340 that is configured to receive a configuration comprising an RX-RS-TX-RS proximity parameter, e.g., as described in connection with 1202 of FIG. 12. The parameter component 1340 may be further configured to determine the RX-RS-TX-RS proximity parameter defining a proximity window around an RX-RS resource for receiving an RX-RS, e.g., as described in connection with 1101 of FIG. 11 or 1204 of FIG. 12. The communication manager 1332 further includes an identification component 1342 that is configured to identify a TX-RS resource of at least one TX-RS resource for transmitting TX-RS within a proximity window around a RX-RS resource for receiving RX-RS, e.g., as described in connection with 1102 of FIG. 11 or 1206 of FIG. 12. The communication manager 1332 further includes a determination component 1344 that is configured to determine that transmission of TX-RS in a first TX-RS resource was missed, e.g., as described in connection with 1208 of FIG. 12. The determination component 1344 may be further configured to determine that transmission of TX-RX in the second TX-RS resource was missed, e.g., as described in connection with 1212 of FIG. 12. The determination component 1344 may be further configured to determine that transmission of the TX-RS in the identified TX-RS resource was missed, e.g., as described in connection with 1214 of FIG. 12. The determination component 1344 may be further configured to determine that transmission of the TX-RS in a second TX-RS resource was missed, e.g., as described in connection with 1218 of FIG. 12. The communication manager 1332 further includes a timing component 1346 that is configured to maintain transmission timing information associated with transmission of TX-RS in the first TX-RS resource, e.g., as described in connection with 1210 of FIG. 12. The communication manager 1332 further includes a measurement component 1348 that is configured to measure the UE RX-TX time difference, e.g., as described in connection with 1104 of FIG. 11 or 1220 of FIG. 12. The measurement component 1348 may be further configured to skip the measurement of the UE RX-TX time difference, e.g., as described in connection with 1216 of FIG. 12. The communication manager 1332 further includes a report component 1350 that is configured to transmit a measurement report including information indicating the identified TX-RS resource, the RX-RS resource, and the measured UE RX-TX time difference, e.g., as described in connection with 1222 of FIG. 12.

The apparatus may include additional components that perform each of the blocks of the algorithm in the flowcharts of FIGS. 11 and 12. As such, each block in the flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for identifying a TX-RS resource of at least one TX-RS resource for transmitting TX-RS within a proximity window around a RX-RS resource for receiving RX-RS. An identified TX-RS resource being used by the UE for determining a UE RX-TX time difference associated with a time difference between reception of the RX-RS and transmission of the TX-RS. The apparatus includes means for measuring the UE RX-TX time difference based on received RX-RS in the RX-RS resource and transmitted TX-RS in the identified TX-RS resource when TX-RS is transmitted in the identified TX-RS resource. The apparatus further includes means for determining a RX-RS-TX-RS proximity parameter defining the proximity window around the RX-RS resource for receiving the RX-RS. The UE RX-TX time difference is measured based on the identified TX-RS resource corresponding to the proximity window. The apparatus further includes means for receiving a configuration comprising the RX-RS-TX-RS proximity parameter. The apparatus further includes means for transmitting, to a wireless communication device, a measurement report including information indicating the identified TX-RS resource, the RX-RS resource, and the measured UE RX-TX time difference. The apparatus further includes means for determining that transmission of TX-RS in the first TX-RS resource was missed. The second TX-RS resource is identified for determining the UE RX-TX time difference. The apparatus further includes means for maintaining transmission timing information associated with transmission of TX-RS in the first TX-RS resource. The apparatus further includes means for determining that transmission of TX-RS in the second TX-RS resource was missed. The first TX-RS resource is identified for determining the UE RX-TX time difference, and a measured the UE RX-TX time difference is based on the maintained transmission timing information. The apparatus further includes means for determining that transmission of the TX-RS in the identified TX-RS resource was missed. The apparatus further includes means for skipping measurement of the UE RX-TX time difference based on the determination that the transmission of the TX-RS in the identified TX-RS resource was missed. The apparatus further includes means for determining that transmission of the TX-RS in the first TX-RS resource was missed. One of the second TX-RS resource or the third TX-RS resource is identified as the TX-RS resource for determining the UE RX-TX time difference. The apparatus further includes means for determining that transmission of the TX-RS in the second TX-RS resource was missed. One of the first TX-RS resource or the third TX-RS resource is identified as the TX-RS resource for determining the UE RX-TX time difference. The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and at least one transceiver and configured to determine a RX-RS-TX-RS proximity parameter defining a proximity window around the RX-RS resource for receiving the RX-RS; identify a TX-RS resource of at least one TX-RS resource for transmitting TX-RS within the proximity window around a RX-RS resource for receiving RX-RS, an identified TX-RS resource being used by the UE for determining a UE RX-TX time difference associated with a time difference between reception of the RX-RS and transmission of the TX-RS; and measure the UE RX-TX time difference based on received RX-RS in the RX-RS resource and transmitted TX-RS in the identified TX-RS resource when TX-RS is transmitted in the identified TX-RS resource.

Aspect 2 is the apparatus of aspect 1, further includes that the UE RX-TX time difference is measured based on the identified TX-RS resource corresponding to the proximity window.

Aspect 3 is the apparatus of any of aspects 1 and 2, further includes that the at least one processor is further configured to receive a configuration comprising the RX-RS-TX-RS proximity parameter.

Aspect 4 is the apparatus of any of aspects 1-3, further includes that the at least one processor is further configured to transmit, to a wireless communication device, a measurement report including information indicating the identified TX-RS resource, the RX-RS resource, and a measured UE RX-TX time difference.

Aspect 5 is the apparatus of any of aspects 1-4, further includes that the wireless communication device comprises a base station, wherein the RX-RS comprises DL PRS, the RX-RS resource comprises a DL PRS resource, the TX-RS comprises SRS, and the TX-RS resource comprises a SRS resource.

Aspect 6 is the apparatus of any of aspects 1-5, further includes that a measured UE RX-TX time difference is based on a UE RX timing of a received PRS and a TX timing of a slot or subframe associated with a transmitted SRS in an identified SRS resource.

Aspect 7 is the apparatus of any of aspects 1-6, further includes that the wireless communication device comprises a second UE, wherein the RX-RS comprises SL-PRS, the RX-RS resource comprises an SL-PRS resource, the TX-RS comprises SL-SRS, and the TX-RS resource comprises an SL-SRS resource.

Aspect 8 is the apparatus of any of aspects 1-7, further includes that a measured UE RX-TX time difference is based on a UE RX timing of a received SL-PRS and a TX timing of a slot or subframe associated with a transmitted SL-SRS in an identified SL-SRS resource.

Aspect 9 is the apparatus of any of aspects 1-8, further includes that the at least one TX-RS resource comprises one TX-RS resource, and wherein the one TX-RS resource is identified for determining the UE RX-TX time difference.

Aspect 10 is the apparatus of any of aspects 1-9, further includes that the at least one TX-RS resource comprises a plurality of TX-RS resources, and wherein a closest TX-RS resource of the plurality of TX-RS resources is identified for determining the UE RX-TX time difference, wherein the closest TX-RS resource is closest in time to the RX-RS resource used for the determining the UE RX-TX time difference.

Aspect 11 is the apparatus of any of aspects 1-10, further includes that the at least one TX-RS resource comprises a plurality of TX-RS resources, and wherein a closest TX-RS resource of the plurality of TX-RS resources in which TX-RS is transmitted in the TX-RS resource is identified for determining the UE RX-TX time difference, wherein the closest TX-RS resource is closest in time to the RX-RS resource used for the determining the UE RX-TX time difference.

Aspect 12 is the apparatus of any of aspects 1-11, further includes that the plurality of TX-RS resources comprises a first TX-RS resource before the RX-RS resource and a second TX-RS resource after the RX-RS resource, the first TX-RS resource being closer in time to the RX-RS resource than the second TX-RS resource, further includes that the at least one processor is further configured to determine that transmission of TX-RS in the first TX-RS resource was missed, wherein the second TX-RS resource is identified for determining the UE RX-TX time difference.

Aspect 13 is the apparatus of any of aspects 1-12, further includes that the plurality of TX-RS resources comprises a first TX-RS resource before the RX-RS resource and a second TX-RS resource after the RX-RS resource, the second TX-RS resource being closer in time to the RX-RS resource than the first TX-RS resource, further includes that the at least one processor is further configured to maintain transmission timing information associated with transmission of TX-RS in the first TX-RS resource; and determine that transmission of TX-RS in the second TX-RS resource was missed, wherein the first TX-RS resource is identified for determining the UE RX-TX time difference, and a measured the UE RX-TX time difference is based on the maintained transmission timing information.

Aspect 14 is the apparatus of any of aspects 1-13, further includes that the at least one TX-RS resource comprises one TX-RS resource, further includes that the at least one processor is further configured to determine that transmission of the TX-RS in the identified TX-RS resource was missed; and skip measurement of the UE RX-TX time difference based on the determination that the transmission of the TX-RS in the identified TX-RS resource was missed.

Aspect 15 is the apparatus of any of aspects 1-14, further includes that the identifying the TX-RS resource of the at least one TX-RS resource of for transmitting the TX-RS within the proximity window is based at least on a TX-RS resource band or CC.

Aspect 16 is the apparatus of any of aspects 1-15, further includes that the at least one TX-RS resource comprises a first TX-RS resource, a second TX-RS resource, and a third TX-RS resource, the first TX-RS resource being before the RX-RS resource and being closer to the RX-RS resource than the second TX-RS resource and the third TX-RS resource, the second TX-RS resource and the third TX-RS resource being after the RX-RS resource, the third TX-RS resource being in a different CC or band and being closer to the RX-RS resource than the second TX-RS resource, further includes that the at least one processor is further configured to determine that transmission of the TX-RS in the first TX-RS resource was missed, wherein one of the second TX-RS resource or the third TX-RS resource is identified as the TX-RS resource for determining the UE RX-TX time difference.

Aspect 17 is the apparatus of any of aspects 1-16, further includes that the at least one TX-RS resource comprises a first TX-RS resource, a second TX-RS resource, and a third TX-RS resource, the first TX-RS resource being before the RX-RS resource, the second TX-RS resource and the third TX-RS resource being after the RX-RS resource, the second TX-RS resource being closer to the RX-RS resource than the first TX-RS resource and the third TX-RS resource, the third TX-RS resource being in a different CC or band and being closer to the RX-RS resource than the first TX-RS resource, further includes that the at least one processor is further configured to determine that transmission of the TX-RS in the second TX-RS resource was missed, wherein one of the first TX-RS resource or the third TX-RS resource is identified as the TX-RS resource for determining the UE RX-TX time difference.

Aspect 18 is a method of wireless communication for implementing any of aspects 1-17.

Aspect 19 is an apparatus for wireless communication including means for implementing any of aspects 1-17.

Aspect 20 is a computer-readable medium storing computer executable code, where the code when executed by a processor causes the processor to implement any of aspects 1-17.

What is claimed is:

1. An apparatus for wireless communication at a user equipment (UE), comprising:
- a memory;
- at least one transceiver; and
- at least one processor, communicatively connected to the memory and the at least one transceiver, the at least one processor configured to:
  - determine a reception (RX) reference signals (RS) (RX-RS)-transmission (TX) reference signals (RS) (TX-RS) proximity parameter defining a proximity window around the RX-RS resource for receiving the RX-RS;
  - identify a TX-RS resource of at least one TX-RS resource for transmitting TX-RS within the proximity window around a RX-RS resource for receiving RX-RS, an identified TX-RS resource being used by the UE for determining a UE RX-TX time difference associated with a time difference between reception of the RX-RS and transmission of the TX-RS;
  - measure the UE RX-TX time difference based on received RX-RS in the RX-RS resource and transmitted TX-RS in the identified TX-RS resource when TX-RS is transmitted in the identified TX-RS resource; and transmit, to a wireless communication device, a measurement report including information indicating the identified TX-RS resource, the RX-RS resource, and a measured UE RX-TX time difference.

2. The apparatus of claim 1, wherein the UE RX-TX time difference is measured based on the identified TX-RS resource corresponding to the proximity window.

3. The apparatus of claim 2, wherein the at least one processor is further configured to:

receive a configuration comprising the RX-RS-TX-RS proximity parameter.

4. The apparatus of claim 1, wherein the at least one TX-RS resource comprises a first TX-RS resource, a second TX-RS resource, and a third TX-RS resource, the first TX-RS resource being before the RX-RS resource, the second TX-RS resource and the third TX-RS resource being after the RX-RS resource, the second TX-RS resource being closer to the RX-RS resource than the first TX-RS resource and the third TX-RS resource, the third TX-RS resource being in a different component carrier (CC) or band and being closer to the RX-RS resource than the first TX-RS resource, wherein the at least one processor is further configured to:

determine that transmission of the TX-RS in the second TX-RS resource was missed, wherein one of the first TX-RS resource or the third TX-RS resource is identified as the TX-RS resource for determining the UE RX-TX time difference.

5. The apparatus of claim 1, wherein the wireless communication device comprises a base station, wherein the RX-RS comprises downlink (DL) position reference signals (PRS), the RX-RS resource comprises a DL PRS resource, the TX-RS comprises sounding reference signals (SRS), and the TX-RS resource comprises a SRS resource.

6. The apparatus of claim 5, wherein a measured UE RX-TX time difference is based on a UE RX timing of a received PRS and a TX timing of a slot or subframe associated with a transmitted SRS in an identified SRS resource.

7. The apparatus of claim 1, wherein the wireless communication device comprises a second UE, wherein the RX-RS comprises sidelink position reference signals (SL-PRS), the RX-RS resource comprises an SL-PRS resource, the TX-RS comprises SL sounding reference signals (SL-SRS), and the TX-RS resource comprises an SL-SRS resource.

8. The apparatus of claim 7, wherein a measured UE RX-TX time difference is based on a UE RX timing of a received SL-PRS and a TX timing of a slot or subframe associated with a transmitted SL-SRS in an identified SL-SRS resource.

9. The apparatus of claim 1, wherein the at least one TX-RS resource comprises one TX-RS resource, and wherein the one TX-RS resource is identified for determining the UE RX-TX time difference.

10. The apparatus of claim 1, wherein the at least one TX-RS resource comprises a plurality of TX-RS resources, and wherein a closest TX-RS resource of the plurality of TX-RS resources is identified for determining the UE RX-TX time difference, wherein the closest TX-RS resource is closest in time to the RX-RS resource used for the determining the UE RX-TX time difference.

11. The apparatus of claim 1, wherein the at least one TX-RS resource comprises a plurality of TX-RS resources, and wherein a closest TX-RS resource of the plurality of TX-RS resources in which TX-RS is transmitted in the TX-RS resource is identified for determining the UE RX-TX time difference, wherein the closest TX-RS resource is closest in time to the RX-RS resource used for the determining the UE RX-TX time difference.

12. The apparatus of claim 11, wherein the plurality of TX-RS resources comprises a first TX-RS resource before the RX-RS resource and a second TX-RS resource after the RX-RS resource, the first TX-RS resource being closer in time to the RX-RS resource than the second TX-RS resource, wherein the at least one processor is further configured to:

determine that transmission of TX-RS in the first TX-RS resource was missed, wherein the second TX-RS resource is identified for determining the UE RX-TX time difference.

13. The apparatus of claim 11, wherein the plurality of TX-RS resources comprises a first TX-RS resource before the RX-RS resource and a second TX-RS resource after the RX-RS resource, the second TX-RS resource being closer in time to the RX-RS resource than the first TX-RS resource, wherein the at least one processor is further configured to:

maintain transmission timing information associated with transmission of TX-RS in the first TX-RS resource; and determine that transmission of TX-RS in the second TX-RS resource was missed, wherein the first TX-RS resource is identified for determining the UE RX-TX time difference, and a measured the UE RX-TX time difference is based on the maintained transmission timing information.

14. The apparatus of claim 1, wherein the at least one TX-RS resource comprises one TX-RS resource, wherein the at least one processor is further configured to:

determine that transmission of the TX-RS in the identified TX-RS resource was missed; and skip measurement of the UE RX-TX time difference based on the determination that the transmission of the TX-RS in the identified TX-RS resource was missed.

15. The apparatus of claim 1, wherein the identifying the TX-RS resource of the at least one TX-RS resource of for transmitting the TX-RS within the proximity window is based at least on a TX-RS resource band or component carrier (CC).

16. The apparatus of claim 1, wherein the at least one TX-RS resource comprises a first TX-RS resource, a second TX-RS resource, and a third TX-RS resource, the first TX-RS resource being before the RX-RS resource and being closer to the RX-RS resource than the second TX-RS resource and the third TX-RS resource, the second TX-RS resource and the third TX-RS resource being after the RX-RS resource, the third TX-RS resource being in a different component carrier (CC) or band and being closer to the RX-RS resource than the second TX-RS resource, wherein the at least one processor is further configured to:

determine that transmission of the TX-RS in the first TX-RS resource was missed, wherein one of the second TX-RS resource or the third TX-RS resource is identified as the TX-RS resource for determining the UE RX-TX time difference.

17. An apparatus for wireless communication at a user equipment (UE), comprising:

means for determining a reception (RX) reference signals (RS) (RX-RS)-transmission (TX) reference signals (RS) (TX-RS) proximity parameter defining a proximity window around the RX-RS resource for receiving the RX-RS;

means for identifying a TX-RS resource of at least one TX-RS resource for transmitting TX-RS within the proximity window around a RX-RS resource for receiving RX-RS, an identified TX-RS resource being used by the UE for determining a UE RX-TX time difference associated with a time difference between reception of the RX-RS and transmission of the TX-RS;

means for measuring the UE RX-TX time difference based on received RX-RS in the RX-RS resource and transmitted TX-RS in the identified TX-RS resource when TX-RS is transmitted in the identified TX-RS resource; and means for transmitting, to a wireless communication device, a measurement report including information indicating the identified TX-RS resource, the RX-RS resource, and the measured UE RX-TX time difference.

18. A method of wireless communication of a user equipment (UE), comprising:

determining a reception (RX) reference signals (RS) (RX-RS)-transmission (TX) reference signals (RS) (TX-RS) proximity parameter defining a proximity window around the RX-RS resource for receiving the RX-RS;

identifying a TX-RS resource of at least one TX-RS resource for transmitting TX-RS within the proximity window around a RX-RS resource for receiving RX-RS, an identified TX-RS resource being used by the UE for determining a UE RX-TX time difference associated with a time difference between reception of the RX-RS and transmission of the TX-RS;

measuring the UE RX-TX time difference based on received RX-RS in the RX-RS resource and transmitted TX-RS in the identified TX-RS resource when TX-RS is transmitted in the identified TX-RS resource; and transmitting, to a wireless communication device, a measurement report including information indicating the identified TX-RS resource, the RX-RS resource, and the measured UE RX-TX time difference.

19. The method of claim 18, wherein the UE RX-TX time difference is measured based on the identified TX-RS resource corresponding to the proximity window.

20. The method of claim 19, further comprising:

receiving a configuration comprising the RX-RS-TX-RS proximity parameter.

21. The method of claim 18, wherein the at least one TX-RS resource comprises a first TX-RS resource, a second TX-RS resource, and a third TX-RS resource, the first TX-RS resource being before the RX-RS resource, the second TX-RS resource and the third TX-RS resource being after the RX-RS resource, the second TX-RS resource being closer to the RX-RS resource than the first TX-RS resource and the third TX-RS resource, the third TX-RS resource being in a different component carrier (CC) or band and being closer to the RX-RS resource than the first TX-RS resource, the method further comprising:

determining that transmission of the TX-RS in the second TX-RS resource was missed, wherein one of the first TX-RS resource or the third TX-RS resource is identified as the TX-RS resource for determining the UE RX-TX time difference.

22. The method of claim 18, wherein the at least one TX-RS resource comprises a plurality of TX-RS resources, and wherein a closest TX-RS resource of the plurality of TX-RS resources in which TX-RS is transmitted in the TX-RS resource is identified for determining the UE RX-TX time difference, wherein the closest TX-RS resource is closest in time to the RX-RS resource used for the determining the UE RX-TX time difference.

23. The method of claim 22, wherein the plurality of TX-RS resources comprises a first TX-RS resource before the RX-RS resource and a second TX-RS resource after the RX-RS resource, the first TX-RS resource being closer in time to the RX-RS resource than the second TX-RS resource, the method further comprising:

determining that transmission of TX-RS in the first TX-RS resource was missed, wherein the second TX-RS resource is identified for determining the UE RX-TX time difference.

24. The method of claim 22, wherein the plurality of TX-RS resources comprises a first TX-RS resource before the RX-RS resource and a second TX-RS resource after the RX-RS resource, the second TX-RS resource being closer in time to the RX-RS resource than the first TX-RS resource, the method further comprising:

maintaining transmission timing information associated with transmission of TX-RS in the first TX-RS resource; and determining that transmission of TX-RS in the second TX-RS resource was missed, wherein the first TX-RS resource is identified for determining the UE RX-TX time difference, and a measured the UE RX-TX time difference is based on the maintained transmission timing information.

25. The method of claim 18, wherein the at least one TX-RS resource comprises one TX-RS resource, the method further comprising:

determining that transmission of the TX-RS in the identified TX-RS resource was missed; and skipping measurement of the UE RX-TX time difference based on the determination that the transmission of the TX-RS in the identified TX-RS resource was missed.

26. The method of claim 18, wherein the identifying the TX-RS resource of the at least one TX-RS resource of for transmitting the TX-RS within the proximity window is based at least on a TX-RS resource band or component carrier (CC).

27. The method of claim 18, wherein the at least one TX-RS resource comprises a first TX-RS resource, a second TX-RS resource, and a third TX-RS resource, the first TX-RS resource being before the RX-RS resource and being closer to the RX-RS resource than the second TX-RS resource and the third TX-RS resource, the second TX-RS resource and the third TX-RS resource being after the RX-RS resource, the third TX-RS resource being in a different component carrier (CC) or band and being closer to the RX-RS resource than the second TX-RS resource, the method further comprising:

determining that transmission of the TX-RS in the first TX-RS resource was missed, wherein one of the second TX-RS resource or the third TX-RS resource is identified as the TX-RS resource for determining the UE RX-TX time difference.

28. A non-transitory computer-readable medium storing computer executable code at a user equipment (UE), the code when executed by a processor causes the processor to:

determine a reception (RX) reference signals (RS) (RX-RS)-transmission (TX) reference signals (RS) (TX-RS) proximity parameter defining a proximity window around the RX-RS resource for receiving the RX-RS;

identify a TX-RS resource of at least one TX-RS resource for transmitting TX-RS within the proximity window around a RX-RS resource for receiving RX-RS, an identified TX-RS resource being used by the UE for determining a UE RX-TX time difference associated with a time difference between reception of the RX-RS and transmission of the TX-RS;

measure the UE RX-TX time difference based on received RX-RS in the RX-RS resource and transmitted TX-RS in the identified TX-RS resource when TX-RS is transmitted in the identified TX-RS resource; and transmit, to a wireless communication device, a measurement report including information indicating the identified TX-RS resource, the RX-RS resource, and the measured UE RX-TX time difference.

* * * * *